United States Patent [19]

Meeks

[11] 3,877,450
[45] Apr. 15, 1975

[54] INTERNAL COMBUSTION ENGINE POLLUTION CONTROL APPARATUS

[75] Inventor: Thomas Meeks, Compton, Calif.

[73] Assignee: Matt Perdue, Long Beach, Calif. ; a part interest

[22] Filed: June 4, 1973

[21] Appl. No.: 366,642

[52] U.S. Cl............... 123/119 E; 123/1 A; 123/152
[51] Int. Cl............................................. F02d 21/02
[58] Field of Search............ 123/119 E, 119 A, 1 A, 123/75 B, 26, 90.11, 151, 152

[56] References Cited
UNITED STATES PATENTS

| | | | |
|---|---|---|---|
| 1,664,610 | 4/1928 | French................. | 123/90.11 |
| 2,648,317 | 8/1953 | Mikulasek et al. ................. | 123/1 A |
| 2,720,856 | 10/1955 | Hoke, Jr. ......................... | 123/119 A |
| 3,017,872 | 1/1962 | Candelise............................ | 123/75 B |
| 3,141,448 | 7/1964 | Candelise............................ | 123/26 |
| 3,195,518 | 7/1965 | Candelise............................ | 123/26 |
| 3,507,260 | 4/1970 | Walker ............................. | 123/119 A |
| 3,696,795 | 10/1972 | Smith et al...................... | 123/119 E |

Primary Examiner—Charles J. Myhre
Assistant Examiner—Sheldon Richter
Attorney, Agent, or Firm—Fulwider Patton Rieber Lee & Utecht

[57] ABSTRACT

A pollution control apparatus for an internal combustion engine. Oxygen is utilized to augment the normal air supply and thereby promote complete fuel combustion. Separate oxygen conduits are connected to each cylinder, flow through the conduits being controlled by solenoid operated valves connected in parallel with the spark plug leads. The connections are such that the current impulse which fires the plug of one cylinder effects release of oxygen to another cylinder during its intake stroke. Introduction of oxygen downstream of the carburetor of a carburetor equipped engine desirably prevents the oxygen flow from affecting the carburetor established fuel-air ratios.

8 Claims, 4 Drawing Figures

INTERNAL COMBUSTION ENGINE POLLUTION CONTROL APPARATUS

BACKGROUND OF THE INVENTION

1. Field of the Invention

The present invention relates to pollution control apparatus for an internal combustion engine, and particularly to such an apparatus which utilizes oxygen to promote more complete fuel combustion.

2. Description of the Prior Art

Internal combustion engines are notoriously productive of noxious exhaust emissions, a great proportion of which are due to incomplete combustion. Various means have been advanced in the prior art to effect more complete combustion, including afterburners and oxygen injection systems, for example. However, most of these systems have apparently been either inefficient, unduly expensive to produce, or not practical in operation. For example, some oxygen injection systems inject the oxygen into the carburetor. The resultant increase in fluid flow adversely affects the fuel-air ratio of the carburetor and the engine tends to overspeed. Moreover, none of the injection systems appears to concern itself with a precise metering of oxygen to the individual cylinders, sequentially and at the proper time for maximum benefit.

SUMMARY

According to the present invention, an internal combustion engine pollution control apparatus is provided which precisely feeds gaseous oxygen to each cylinder at exactly the right time. This is accomplished by coupling individual oxygen conduits to the various cylinders, with each conduit including a current impulse operated flow control device. The device is normally closed, being opened by a current impulse generated in response to regular engine operation.

Although the current impulse could be developed in a number of ways which will suggest themselves to those skilled in the art, a preferred embodiment of the present invention derives the necessary current impulses from the existing ignition system, whether it be one of the electronic systems or the older distributor systems. That is, the spark plug leads are connected in parallel with leads to the flow control devices so that both are operated simultaneously. Proper sequencing requires that the oxygen be admitted to a cylinder in advance of ignition, so the spark plug of one cylinder is connected in parallel with the flow control device lead for a different cylinder, and preferably one about to commence its intake stroke.

Other objects and features of the invention will become apparent from consideration of the following description taken in connection with the accompanying drawings.

DESCRIPTION OF THE PREFERRED EMBODIMENTS

Figure 1:
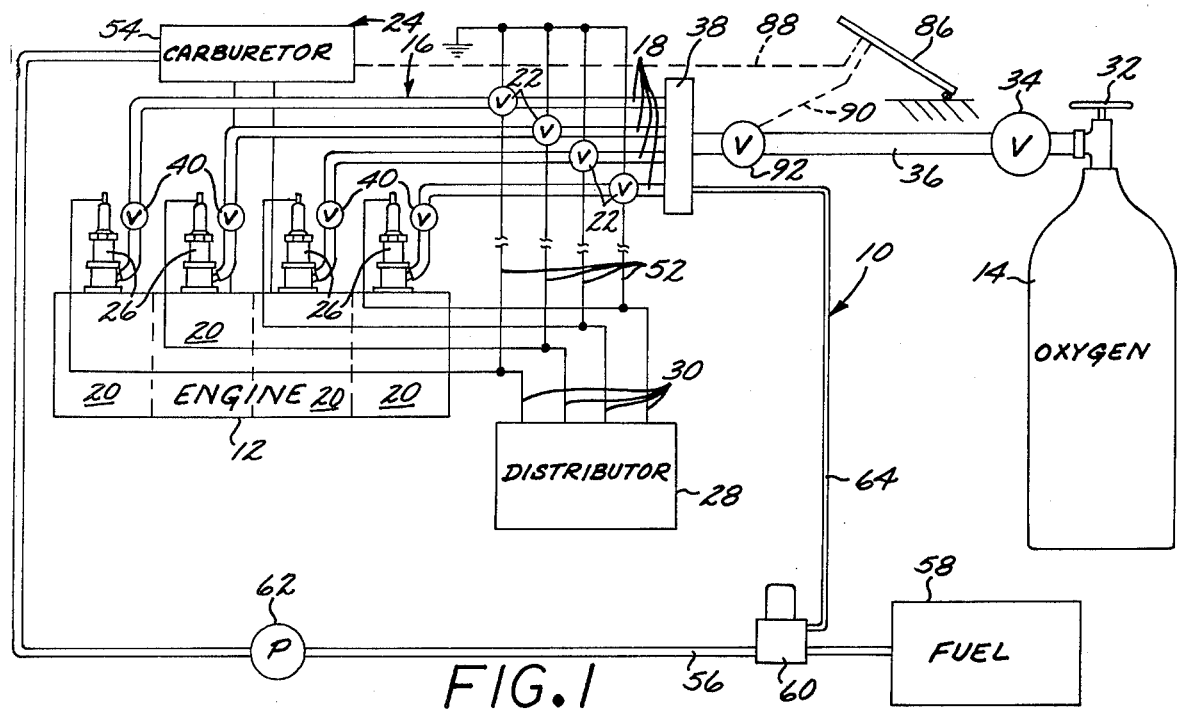
FIG. 1 is a diagrammatic view of one embodiment of a pollution control apparatus according to the present invention.
Figure 2:
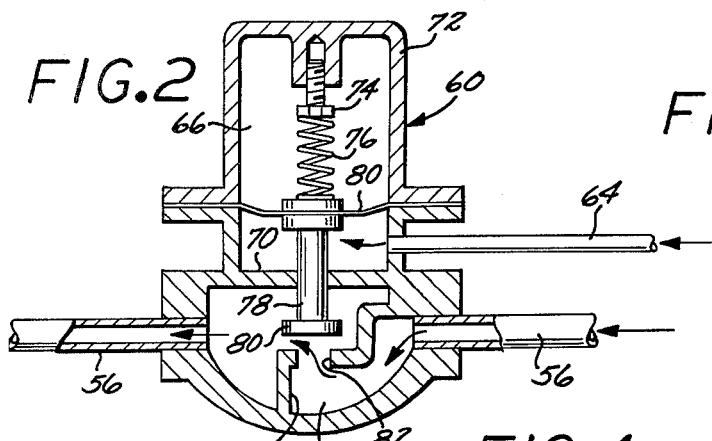
FIG. 2 is an enlarged cross-sectional view of the fuel shut-off valve of the apparatus of FIG. 1.

Referring now to the drawings, particularly FIGS. 1 through 4, there is illustrated a pollution control apparatus 10, according to the present invention, adapted for association with a four-cycle, four-cylinder internal combustion engine 12.

The pollution control apparatus 10 comprises, generally, an oxygen source 14; oxygen distribution means 16, including a plurality of oxygen lines or conduits 18, equal in number to the number of engine cylinders and arranged to carry oxygen from the oxygen source 14 to the four engine cylinders, which are schematically indicated at 20.

The apparatus 10 further includes four, normally closed flow control devices, such as solenoid operated valves 22, located in the conduits 18, respectively. The solenoid portion of each valve 22 is, as is well known, operative in response to a current impulse to open and allow oxygen to flow through the associated conduit 18. With this arrangement oxygen can be applied in controlled amounts to the engine cylinders 20 in response to current impulses developed in response to regular engine operation, as will be seen.

The exemplary engine 12 which is illustrated comprises, generally, a fuel-air introduction system 24 for introducing predetermined quantities of fuel and air into the cylinders 20; four spark plugs 26 for the four cylinders 20; and ignition means, such as a conventional distributor 28 and associated spark plug leads 30, for sequentially applying current pulses to the spark plugs 26 to effect ignition of the fuel and air mixtures in the cylinders 20.

The particular means by which the pollution control apparatus 10 introduces compressed oxygen into the engine 12 to promote more complete fuel combustion will next be described.

The oxygen source 14 is preferably a bottle or tank of oxygen compressed to a relatively high level, although a liquid oxygen tank and suitable vaporizer (not shown) could be used instead if desired. The oxygen is released from the tank or source 14 by operating a usual hand valve 32 which feeds the oxygen through a conventional regulator valve 34. The valve 34 drops the pressure of the oxygen to a level suitable for use in the engine 12, as will be apparent.

Oxygen passes from the regulator valve 34 through a conduit 36 to an oxygen manifold 38 from which the four oxygen conduits 18 extend.

The four solenoid valves 22 in the conduits 18 are each of conventional construction, being responsive to a current impulse to open the associated valve and allow oxygen to pass through the valve toward the associated engine cylinder 20.

In the embodiment of FIG. 1, it is preferred to locate four one-way valves 40 in the conduits 18, respectively, to prevent combustion pressures from passing upstream toward the valves 22.

Figure 3:
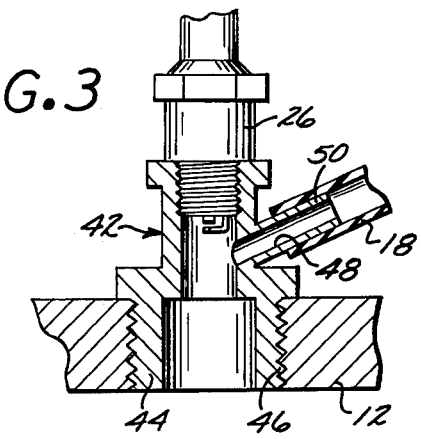
FIG. 3 is an enlarged cross-sectional view of one of the spark-plug adapters of the apparatus of FIG. 1.

With particular reference to FIGS. 1 & 3, spark plugs 26 are of conventional construction, each being threaded into the open upper extremity of an adapter 42, whose lower extremity 44 is threaded into one of the spark plug ports 46 of the engine cylinder block. The adapter 42 includes a central passage so that the spark plug electrode is in communication with the combustible mixture in the associated engine cylinder 20.

In addition, a side passage 48 is in communication with the adapter central passage, the passage 48 being defined by a laterally and upwardly extending tubular portion 50 integral with the adaptor 42. The portion 50 mounts the discharge end of one of the conduits 18 to feed oxygen through the adapter to the engine cylinder. The adapters 42 thus make it possible to utilize conventional spark plugs with the pollution control apparatus 10.

The spark plug leads 30 connected to the distributor 28 are also connected in parallel with four leads or electrical conductors 52 coupled to the solenoids of the solenoid valves 22. With this arrangement the current impulse generated by the usual induction coil (not shown), and passing from the distributor 28 through one of the spark plug leads 30, is also applied to one of the solenoids through a lead 52. Thus, the parallel-connected spark plug 26 and solenoid valve 22 are operated simultaneously.

Identifying the plugs 26, valves 22, and cylinders 20 as numbers 1–4, viewed from left to right in FIG. 1, the No. 1 plug is preferably not electrically coupled to the No. 1 valve 22. Assuming the firing order of the engine 12 is 1–3–2–4, when cylinder No. 1 is fired or is on its power stroke, cylinder No. 2 is commencing or about to commence its intake stroke. Consequently, it is the No. 2 cylinder into which oxygen is to be injected when No. 1 plug is fired. Therefore, assuming the firing order previously mentioned, the preferred corresponding operational order of actuation of the solenoid valves is 2–4–1–3. Of course, this would be altered for a different firing order or where the number of cylinders is different. The important aspect of oxygen injection is simply to insure that injection occurs during a portion of the cylinder operating cycle when the oxygen can be thoroughly mixed with the incoming fuel and air mixture. Moreover, it will be apparent that solenoid valves can be selected and adjusted to provide the duration of opening desired for each current impulse to the solenoid. This would be established during operational testing of the particular engine.

The embodiment of FIG. 1 utilizes a fuel-air introduction system 24 which includes a conventional carburetor 54 to which fuel is fed by means of a conduit 56 connected to a fuel source or tank 58. Fuel from the tank 58 passes through a fuel shut-off valve 60, illustrated in detail in FIG. 2, and a conventional fuel pump 62 located in conduit 56 provides fuel pressure. In this regard most elements of the engine 12 are conventional, including the fuel-air introduction and ignition systems, the intent of the present invention being to require as little alteration as possible to incorporate the pollution control apparatus 10 in the engine 12.

The shut-off valve 60 is designed to prevent the vehicle operator from deliberately disconnecting the pollution control apparatus 10. This is done by providing an auxiliary oxygen line 64 leading from the manifold 38 to the fuel shutoff valve 60. The valve 60 includes an upper chamber 66 and a lower chamber 68 which are separated by an integral partition 70. The upper portion of the valve 60 is of two-part construction, including a dome 72 which threadedly mounts a spring rate adjustment screw 74 in its upper extremity. The upper end of a compression spring 76 rests against the head of the screw 74, and at its lower end the spring 76 bears against the upper head of a vertically reciprocable valve element 78.

The upper end of the valve element 78 is mounted to a flexible diaphragm 80 which is held in position between flanged portions of the two upper parts of the valve 60, as illustrated. Normally the bias or spring rate of the spring 76 is sufficient to press the valve element 78 downwardly so that the lower end 80 of the valve closes off a valve port 82 defined by an integral partition 84 extending across the chamber 68 of the valve lower portion. The portions of the chamber 68 on opposite sides of the partition 84 are in communication with the fuel conduit 56 from the fuel tank 58. Thus, when the valve element 78 is normally in its down or close position, fuel cannot pass from the fuel tank 58 to the carburetor 54. However, normal operating pressure of the oxygen in the pollution control apparatus 10 is such that when this oxygen is applied to the underside of the flexible diaphragm 80, by means of the oxygen line 64, the oxygen pressure is sufficient to raise the valve element 78 against the bias of the spring 76 to open the valve port 82 and allow fuel to pass to the carburetor 54. With this arrangement it will be apparent that fuel is prevented from passing to the carburetor unless the oxygen system is also in operation. Therefore, a vehicle operator cannot deliberately disconnect the pollution control apparatus 10 without disabling the engine 12.

The carburetor 54 is of conventional construction and includes the usual throttle valve (not shown) which is connected by suitable linkages to an accelerator pedal 86, the linkages being diagrammatically shown at 88. In addition to this conventional system, a similar linkage 90 is connected to the pedal 86 for operation of a conventional throttle valve 92 in the oxygen conduit 36 leading to the manifold 38. With this arrangement, when the pedal 86 is operated to open the throttle valve of the carburetor 54, there will be a corresponding opening of the valve 92. Consequently, as the engine accelerates there will be a complemental increase in the amount of oxygen fed to the engine by the apparatus 10.

The carburetor 54 is an exemplary form of fuel air introduction system and it will be apparent that the present apparatus 10 is equally applicable to a fuel injection system in which fuel is directly injected into the cylinders 20. In that eventuality, the fuel shut-off valve 60 would simply be placed in the supply line to the fuel injectors, as will be apparent.

Figure 4:
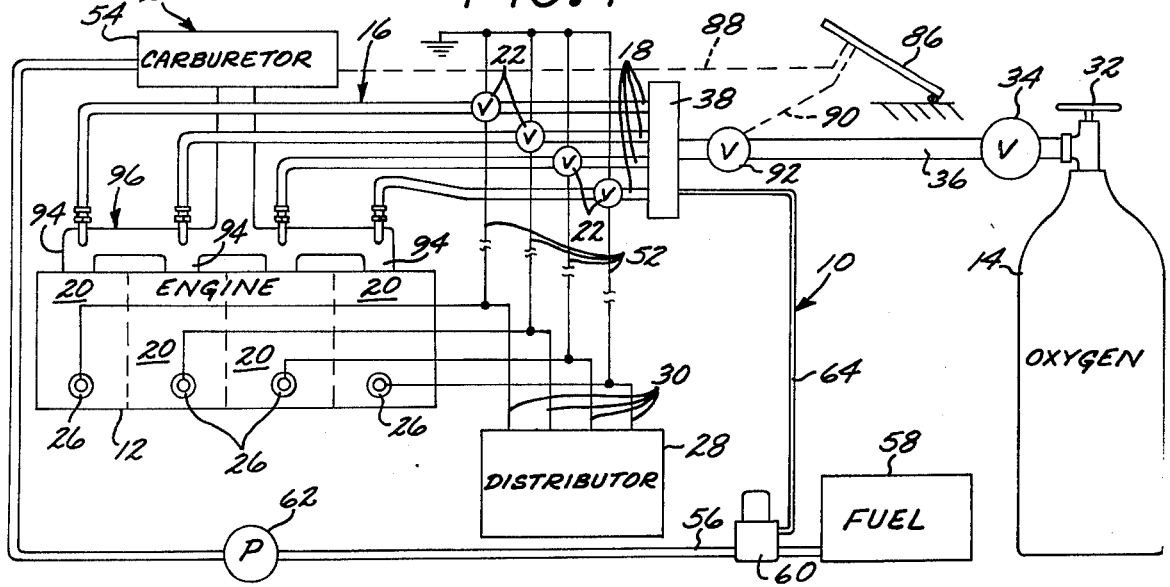
FIG. 4 is a diagrammatic view of another embodiment of a pollution control apparatus according to the present invention.

Referring now to the embodiment of FIG. 4, this embodiment is identical in all respects to the embodiment of FIG. 1 except for the provision of a different point of injection of the oxygen. That is, instead of injecting the oxygen through an adapter 42 located at the spark plug port 46, the oxygen is injected in one of the branches 94 of the usual intake manifold 96. Suitable openings are provided in the branches 94, as will be apparent, with threaded fittings attaching the discharge ends of the conduits 18 in position. This injects the oxygen directly into the existing intake valve of each cylinder 20, rather than through its spark plug port.

In operation, the embodiments of FIGS. 1 and 4 are essentially identical. The oxygen valve 32 is opened and, when the accelerator pedal 86 is depressed to operate the carburetor throttle valve, the oxygen throttle valve 92 is operated to feed oxygen through the conduits 18 to the cylinders 20, the oxygen passing through the spark plug ports 46 in the embodiment of FIG. 1, and through the intake valves in the embodiment of FIG. 4.

Actual tests have established that utilization of the pollution control apparatus 10 effects a marked and significant reduction in the exhaust emissions of an internal combustion engine. The tests demonstrated that the addition of oxygen particularly reduced unburned hydrocarbons.

Various modifications and changes may be made with regard to the foregoing detailed description without departing from the spirit of the invention.

I claim:

1. In an internal combustion engine having means for introducing predetermined quantities of fuel and air into the engine cylinders; spark plugs for said cylinders, respectively; and ignition means for sequentially applying current pulses to said spark plugs to effect ignition of the fuel and air mixtures in said cylinders, a pollution control apparatus comprising:
a source of pressurized oxygen;
oxygen distribution means, including conduits arranged to carry oxygen from said source for introduction into said cylinders, respectively, and further including normally closed flow control devices in said conduits, respectively, each responsive to a current impulse to open and allow a predetermined quantity of oxygen to pass through the associated one of said conduits whereby oxygen may be introduced into said cylinders in predetermined sequence for mixture with said fuel and air prior to said ignition; and
leads electrically coupling said spark plugs and said flow control devices, respectively, in parallel whereby application of current impulses to said spark plugs also operates said flow control devices, the coupling of said leads being such that the flow control device for each cylinder is operated ahead of the spark plug for that cylinder.

2. The pollution control apparatus of claim 1, including a plurality of adapters interposed between said spark plugs, respectively, and the engine cylinder block, each of said adapters being coupled to one of said conduits and defining a passage to the associated spark plug port of the engine cylinder block whereby oxygen may be introduced into said cylinders through said spark plug ports.

3. The pollution control apparatus of claim 1 wherein said means for introducing predetermined quantities of fuel and air includes an intake manifold having branches connected to each of said cylinders, said conduits being connected to said intake manifold adjacent said branches, respectively.

4. The pollution control apparatus of claim 1 wherein said means for introducing predetermined quantities of fuel and air includes a carburetor operable by an accelerator pedal to vary the quantity of said fuel and air mixture according to the position of said pedal; said oxygen distribution means including an oxygen throttle valve interposed between said source and said conduits and operable by said accelerator pedal to vary the quantity of oxygen carried from said source.

5. The pollution control apparatus of claim 1 wherein said means for introducing predetermined quantities of fuel and air includes a fuel line for carrying fuel to said engine; and including a normally closed fuel shut-off valve in said fuel line coupled to said oxygen distribution means, said fuel shut-off valve being responsive to oxygen flow through said distribution means to move to an open position.

6. The pollution control apparatus of claim 1 wherein the internal combustion engine is characterized by intake, compression, power and exhaust strokes, and said parallel leads are operative to effect pulsing of the spark plug of one cylinder simultaneously with pulsing of the flow control device of another cylinder about to commence its intake stroke.

7. In a four-cycle internal combustion engine having means for introducing predetermined quantities of fuel and air into the engine cylinders, including an intake manifold having branches connected to each of said cylinders, and a carburetor connected to said intake manifold; spark plugs for said cylinders, respectively; and ignition means for sequentially applying current impulses to said spark plugs to effect ignition of the fuel and air mixture in said cylinders, a pollution control apparatus comprising:
a source of pressurized oxygen;
oxygen distribution means, including conduits arranged to carry oxygen from said source to said branches of said manifold, respectively, and further including normally closed flow control devices in said conduits, respectively, and further including normally closed flow control devices in said conduits, respectively, each responsive to a current impulse to open and allow a predetermined quantity of oxygen to pass through the associated one of said conduits; and
leads electrically coupling said spark plugs and said flow control devices, respectively, in parallel whereby application of a current impulse to each of said spark plugs also operates the flow control device of a cylinder about to commence its intake stroke whereby oxygen may be introduced into said cylinders in proper sequence for mixture with said fuel and air prior to said ignition.

8. The pollution control apparatus of claim 7 wherein said flow control devices are each constituted of a solenoid operated valve.

* * * * *